June 5, 1973  J. W. JACKSON  3,737,498
METHOD FOR HEAT AND VACUUM-PRESSURE MACHINE MOLDING
Original Filed Oct. 29, 1968  4 Sheets-Sheet 1

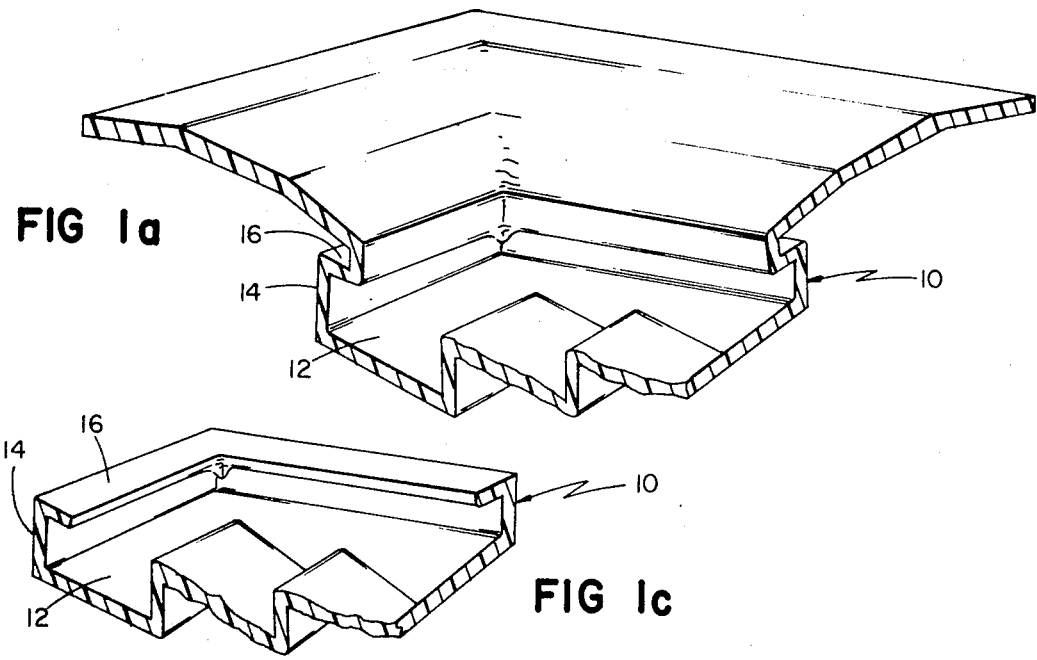
FIG 1a
FIG 1c
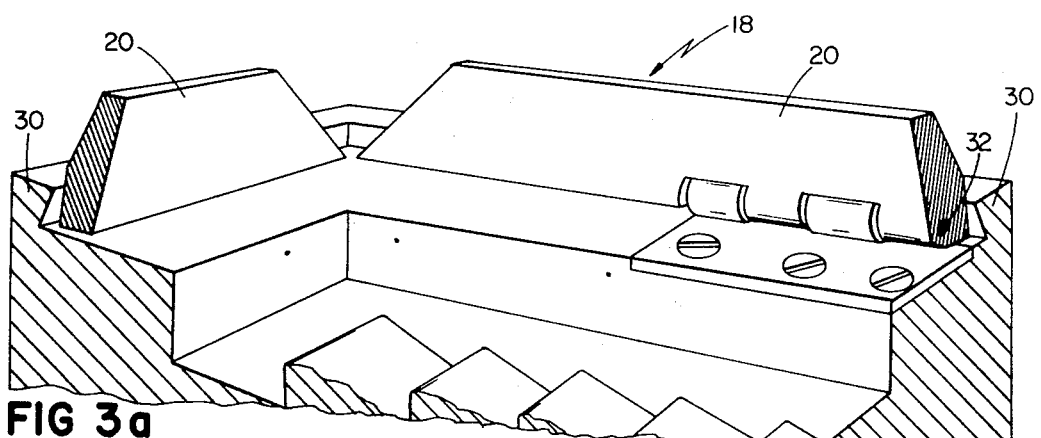
FIG 3a
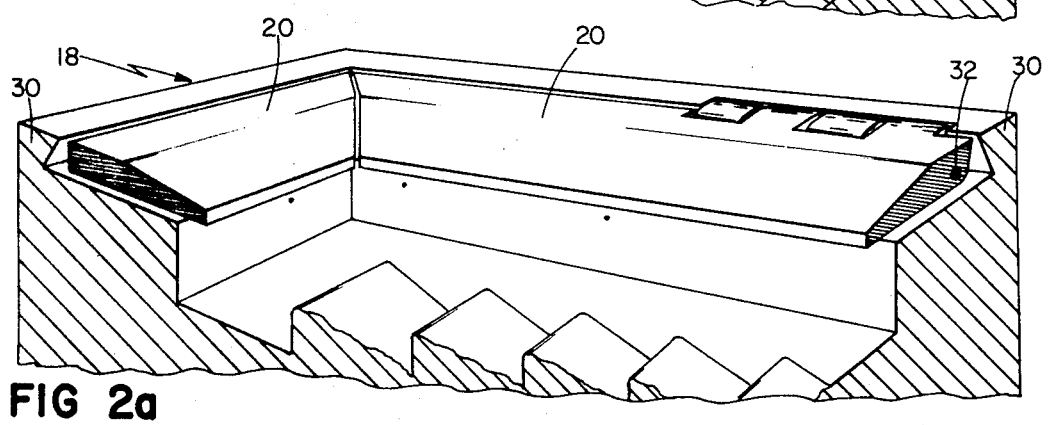
FIG 2a

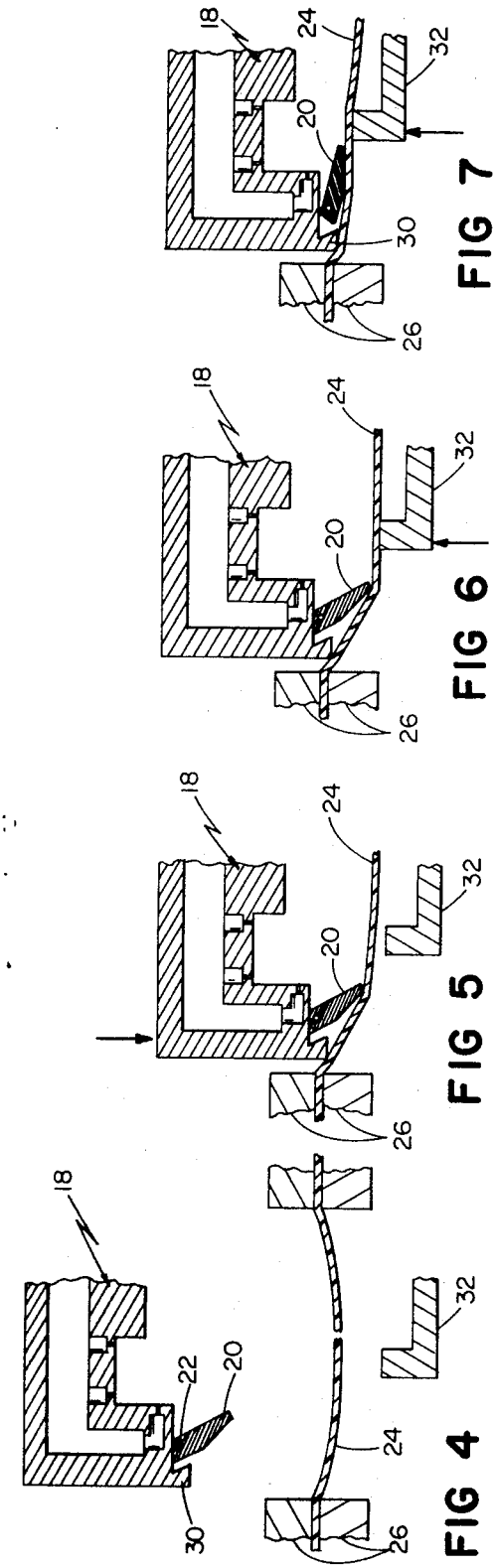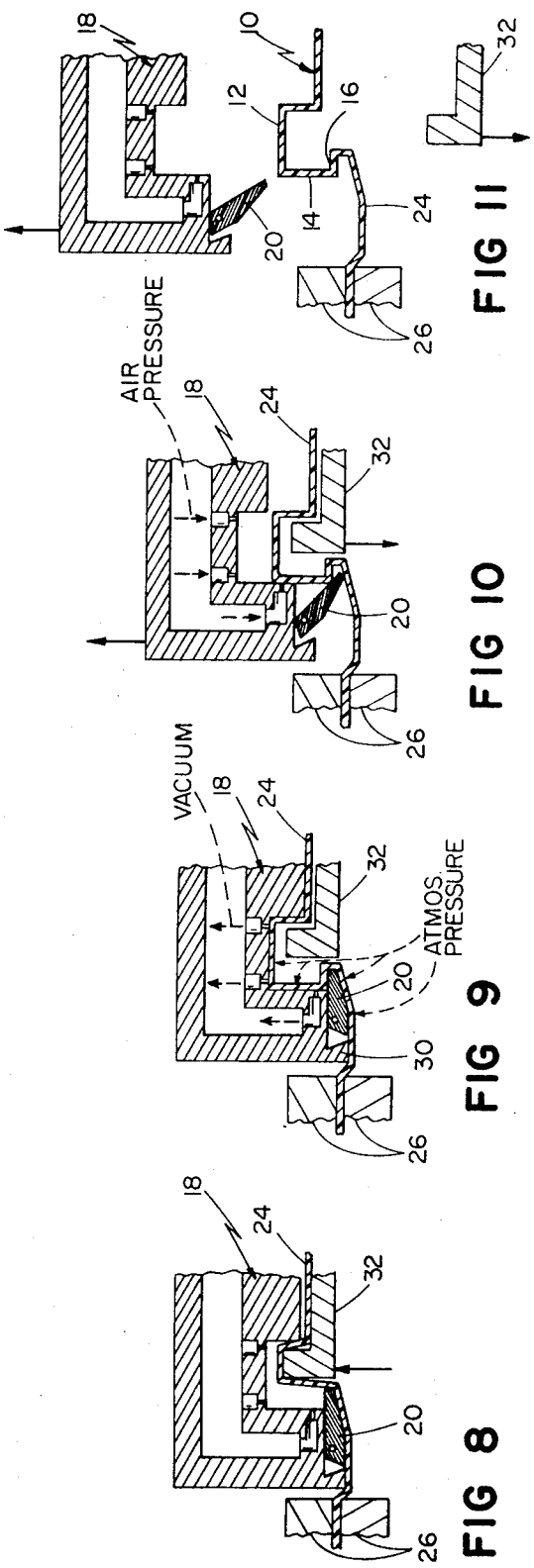

United States Patent Office 3,737,498
Patented June 5, 1973

---

3,737,498
METHOD FOR HEAT AND VACUUM-PRESSURE MACHINE MOLDING
James W. Jackson, East Walpole, Mass., assignor to Bird & Son, Inc., East Walpole, Mass.
Original application Oct. 29, 1968, Ser. No. 771,576, now Patent No. 3,577,593, dated May 4, 1971. Divided and this application Apr. 16, 1971, Ser. No. 134,897
Int. Cl. B29c 17/04
U.S. Cl. 264—92                                   3 Claims

ABSTRACT OF THE DISCLOSURE

Method for heat and vacuum-pressure machine molding of hollow articles from thermoplastic sheet material, involving a mold (normally with alternate vacuum and air pressure sources) having one or more relatively movable complementary molding members for forming undercut, reverse bend, flanged or reentrant portions of said articles, with said member or members being mounted for relative movement, with respect to the molding surface of the mold, into molding position, and thereafter out of such molding position so that a molded article may be freely removed from said mold, said complementary molding member or members being preferably actuated by or through contact with and relative movement of the plastic sheet material by vacuum, with or without the aid of a plug-assist, e.g. where a female external mold is employed.

---

This application is a division of my co-pending application Ser. No. 771,576 filed Oct. 29, 1968, now Pat. No. 3,577,593 dated May 4, 1971.

This invention relates to the field of heat and vacuum-pressure molding of articles, principally hollow open-backed articles, from pre-heated thermoplastic sheet material and wherein said articles have undercut, flanged or reentrant portions, or the like, which necessitate the use of one or more complementary molding members relatively movable with respect to the molding surface of a main mold member first into molding position, and then, out of molding position, thus to accomplish the removal of the molded articles. Various prior patents have been directed to the general end of the molding, from pre-heated flat thermoplastic sheet materials, of articles with various inwardly-recessed or reentrant portions, for example, as in Pat. Nos. 2,784,455; 3,058,153; 3,126,582; 3,172,927; and 3,303,245. None of these patents, however, discloses the apparatus or methods of this invention or having the simplicity, advantages, and capability of novel apparatus and methods of this invention as hereinafter described.

The invention relates to an improved method for heat and vacuum-pressure forming of articles having inwardly undercut, reverse bend, flanges or reentrant portions, etc. from pre-heated thermoplastic sheet material, and is here shown and described, for example, in connection with the manufacture of hollow open-backed articles having reverse-bend flanges, specifically ornamental shutters for houses. The preferred novel method for making such products, as hereinafter described, involves a vacuum-pressure female mold equipped with complementary heat-conducting bodily movable metal molding means and the use thereof, the latter preferably being actuated, at least in part, by and through their contact with and relative movement of the pre-heated thermoplastic sheet. The invention is also applicable to male molds. The preferred combination also commonly includes though not necessarily, in addition, a plug-assist, for forming from a preheated thermoplastic sheet material, of various unitary articles such, for example, as hollow open-backed architectural shutters with reverse-bend inwardly facing flanges as here shown, for exterior use in houses, and similar building construction. Some similar shutters currently are partly handmade and include such recessed zones and a principal object of the invention is to provide for simple, rapid, efficient, accurate and complete machine molding of various such or similar articles in regular economical commercial production operations.

The features, objects, and advantages of the invention will adequately appear in considerable detail from the following description and drawings illustrating and describing preferred aspects of the invention, in which drawings:

FIG. 1(a) is an isometric view of a broken-away inverted corner portion of the article shown in FIG. 1;

FIG. 1(c) is an isometric view of a broken-away corner portion of the trimmed article shown in FIG. 1(b).

FIG. 2(a) is an isometric view of a corner portion of the molding apparatus as shown in FIG. 2;

FIG. 3(a) is an isometric view of a corner portion of the apparatus as shown in FIG. 3; and FIGS. 4–11 show a series of diagrammatic vertical cross-sectional views illustrating successive positions of the apparatus and molding steps of the method of the invention in the forming of the molded article of FIGS. 1 through 1(c).

Figure 1:
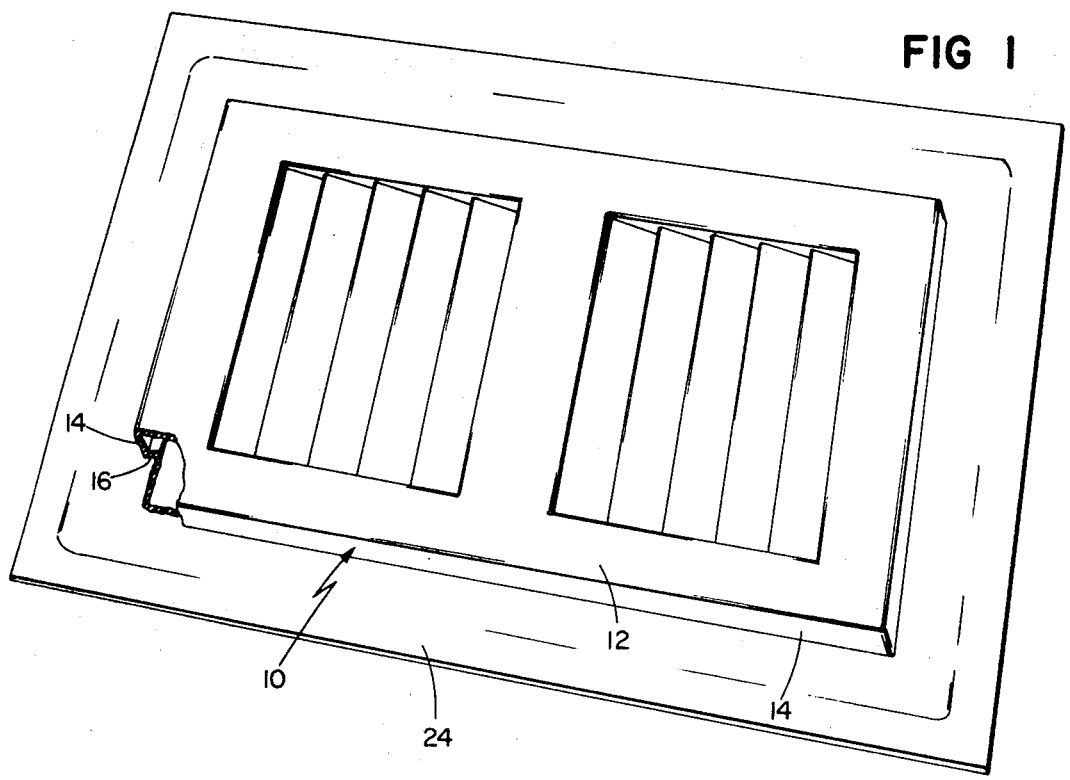
FIG. 1 is an isometric view illustrating one type of article (here the external side of an architectural shutter, with one corner broken away, before edge trimming) which can be formed by the method and apparatus of the invention.

Referring again to the drawings in which like numerals represent like parts, the molded untrimmed ornamental architectural shutter, simulating a wooden shutter, generally designated 10, includes a main portion 12, edges 14, and integral inwardly flanged portions 16, extending continuously (or not) around the inner open-backed perimeter of the shutter proper. As molded, before trimming (FIGS. 1 and 1(a)), each said flange 16 constitutes a portion of the reentrant recess, the lower half of which is subsequently cut away, as will appear by a comparison of the untrimmed shutter of FIGS. 1 and 1(a) with the trimmed article of FIGS. 1(b) and 1(c).

Figure 1B:
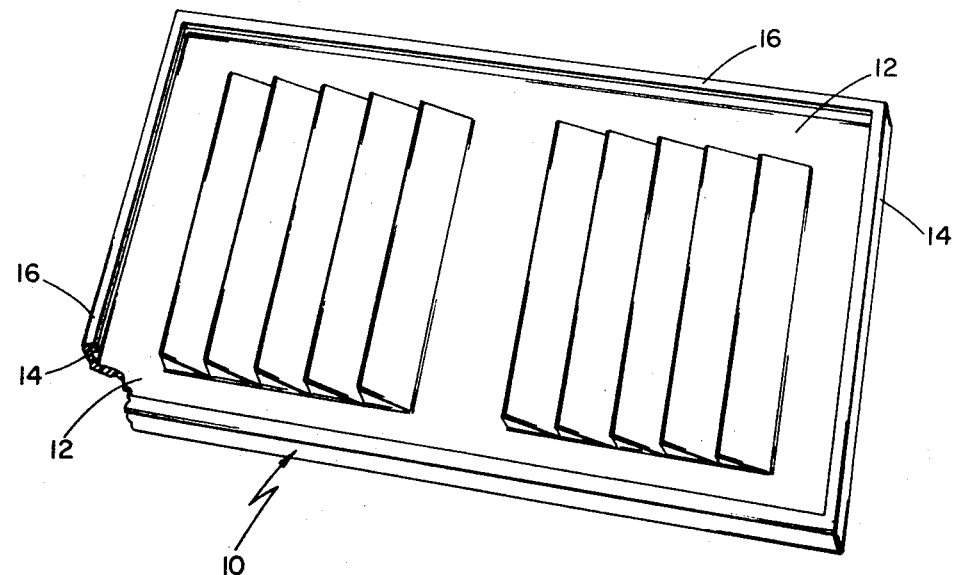
FIG. 1(b) is an isometric view of the opposite side of the article shown in FIG. 1 but in trimmed condition, ready for sale and use.
Figure 3:
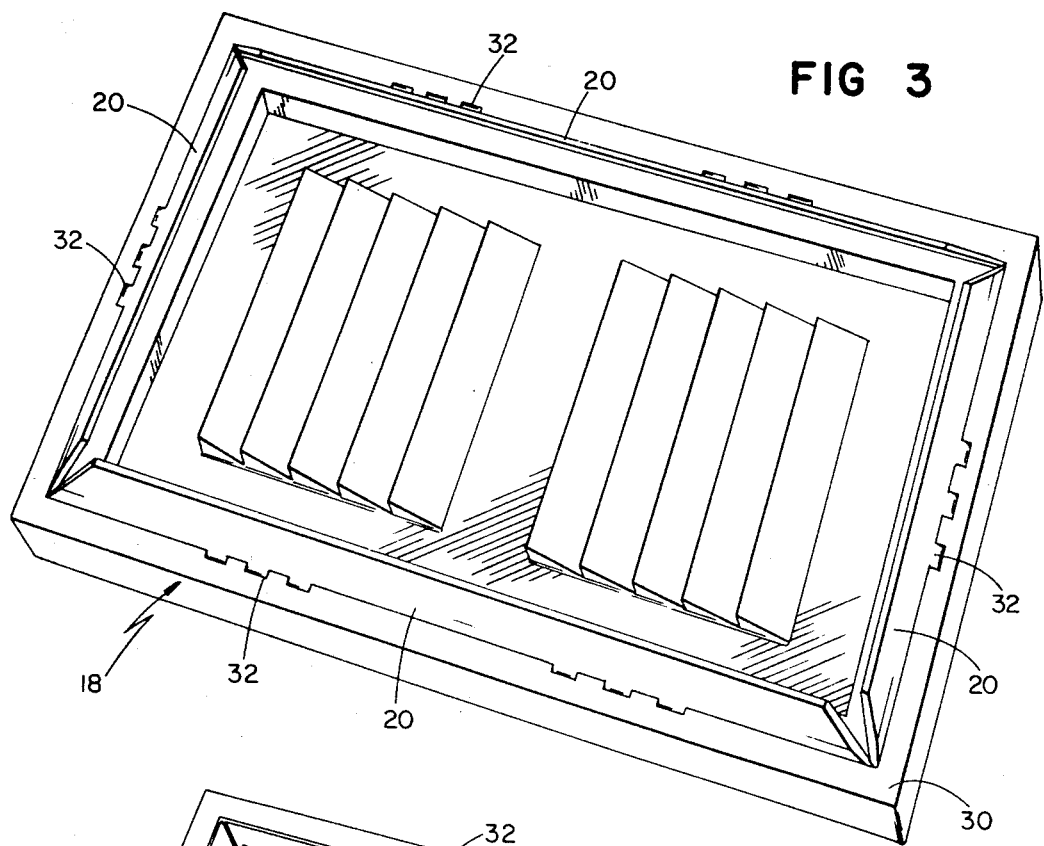
FIG. 3 is a similar view of the apparatus of FIG. 2 but differing in that the complementary mold members are shown in open position after removal of the molded article, thus permitted, and in position for starting the next molding cycle.
Figure 2:
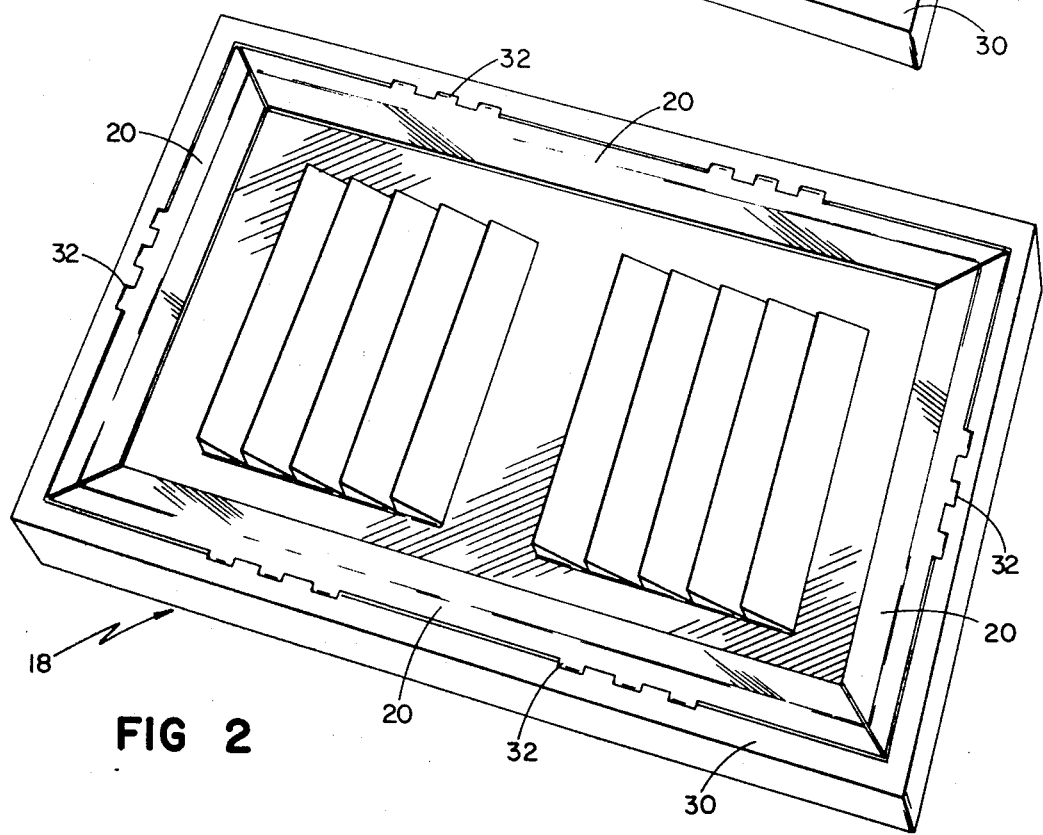
FIG. 2 is an isometric view of the molding side of a female mold for vacuum forming of the article of FIGS. 1 through 1(c), here showing the complementary movable mold members in closed molding position.

FIGS. 2 and 3 are isometric views of the active molding side of a female mold, generally designated 18, suitable for forming the shutter of FIGS. 1 and 1(a). Each such figure shows the interior of the vacuum mold and four movable complementary metal mold members 20, hinged to 18, as appears in FIGS. 2(a) and 3(a), for forming the inturned flanges 16, each of said members 20 having its ends mitered so as to provide four integral molded flanges 16 by reason of the end-mitered members 20 when closed and in molding position, as shown in FIG. 2, as compared with their open position as in FIGS. 3 and 3(a), permitting the removal of the molded article of FIG. 1, and ready to receive another plastic sheet to be moldd.

The preferred successive steps of the method will be evident from the drawings of FIGS. 4–11 comprising a series of diagrammatic vertical cross-sectional views, of a portion of the apparatus, illustrating the successive positions of the apparatus in molding and successive steps in forming the article of FIGS. 1 and 1(a), for example.

FIG. 4 illustrates the conventional holding of a preheated plastic sheet 24 by means of paired sets of sheet clamps 26, four sets of which are normally employed around the perimeter of a rectangular sheet as here; FIG. 5 shows the clamped horizontal heated sheet held in position underneath the vacuum mold by means, not shown, about to be vertically moved (by conventional means not shown) relatively to the mold in a direction transverse to the sheet material. Such movement causes the sheet initially to contact the bottom edges of the complementary mold members 20, hinged at 22, which members 20 depend downwardly from adjacent the bottom margin of mold 18. As also shown in FIGS. 4 and 5, the hinge members so pivoted are shown as limited to about a 60° depending position with respect to the horizontal, and thus are readily liftable about their pivots by their contact with and relative movement of the sheet to the successive positions shown in FIGS. 6, 7 and 8, as the sheet 24 is lifted by the relative vertical movement of the clamps 26 and sheet with respect to the cavity of female mold 18.

Though this result can be accomplished in the absence of a plug-assist, it is preferred to employ a common vertically movable plug-assist 32, shown contacting the sheet in FIGS. 6–10, as an aid to moving the sheet, but primarily to aid in maintaining a more uniform thickness of the molded sheet prior to the first application of the vacuum (between the mold and the sheet, sealed at 30) which allows vacuum and atmospheric pressure (indicated by arrows in FIG. 9) to force the sheet from the position shown in FIG. 8 to that shown in FIG. 9, so that the sheet fully contacts the horizontal and vertical surfaces of the vacuum mold and at the same time, causes it to conform and to be shaped by the shape of the complementary mold members (see FIG. 9) to provide the inturned flanges 16 at the upper side of the reentrant angle portions of the untrimmed article of FIGS. 1 and 1(a). Thus, atmospheric pressure may be supplemented by mechanical (e.g. plug-assist or other) forming means or not, depending somewhat on the size of the article. It will be appreciated that, strictly speaking, the vacuum does not form the sheet but, instead, makes available a pressure differential that enables atmospheric pressure (normally 14.7 p.s.i.) to form the hot plastic sheet. Also, if necessary, in some applications atmospheric pressure may be supplemented by an air pressure box mounted outside of the plug assist that permits air pressures up to 2 or 3 times that of the atmosphere to be used for forming the hot plastic sheet, as provided by currently used apparatus and techniques in the art.

In the absence of a plug-assist, it will be appreciated that the full combination shown in FIG. 8 is not employed, in that the sheet moves directly from the position shown in FIG. 6, to that of FIG. 9 due solely to the influence of atmospheric air pressure and the high vacuum employed (e.g. of the order of 27–28″ mercury).

From FIGS. 10 and 11 it will be appreciated that air pressure applied from within the molds (indicated by arrows) aids gravity in the ejection of the molded article, as is preferred, though such is not always necessary. It will also be seen from these figures that the complementary mold members, as is preferred, swing down by gravity, first, to partially clear the molded article, as in FIG. 10, and then, to the depending position of FIG. 11, again assuming the depending 60° angle as shown and described in connection with FIGS. 4, 5 and 6, ready for the next molding cycle.

Though the heated and pre-softened sheet is described herein as "thermoplastic," as is physically in fact the case during formation of the molded article, it may be constituted of material chemically thermosetting at some late stage of or after molding.

The description therein, as previously mentioned, largely directed to the use of a female mold by way of example, includes various aspects and features also applicable to male molds having one or more complementary movable mold members and the use thereof, and hence various claims hereof are intended to cover both types and other claims each type.

For the purposes of the appended claims, the word "reentrant" is intended to include various articles having undercut, reverse-bend, and internally flanged portions, as well as articles having strictly reentrant portions.

Having described my invention, I claim:

1. A method of vacuum molding plastic articles from thermoplastic sheet material heated to molding temperature comprising:
   moving a suction mold with a molding surface having a complementary movable mold member extending therefrom and heated sheet material relative to each other with the sheet contacting and moving the complementary movable mold member into molding position with respect to said molding surface, molding the sheet by suction into contact with both said molding surface and complementary mold member to provide a molded article including a reentrant portion formed by the movable member, and finally moving said complementary mold member out of molding position permitting removal of the molded article.

2. A method of vacuum molding plastic articles from thermoplastic sheet material heated to molding temperature comprising:
   moving a suction mold with a molding surface having a complementary movable mold member extending therefrom and heated sheet material relative to each other with the sheet contacting and moving the complementary movable mold member mounted adjacent said mold into a position inwardly with respect to said molding surface, molding the sheet by suction into contact with both said molding surface and complementary mold member to provide a molded article including a reentrant portion formed by the movable member and finally by molded sheet contact and gravity moving said complementary mold member out of molding position permitting removal of the molded article.

3. A method of vacuum molding plastic articles from thermoplastic sheet material heated to a molding temperature comprising:
   moving a mold with a molding surface having a complementary movable mold member extending therefrom and heated sheet material relative to each other with the sheet contacting and moving the complementary movable mold member mounted adjacent said mold into molding position inwardly with respect to said molding surface, molding the sheet by suction into contact with both said molding surface and complementary mold members to provide a molded article including a reentrant portion formed by the movable member, and finally by air pressure, sheet contact and gravity moving the complementary mold member out of molding position permitting removal of the molded article.

References Cited

UNITED STATES PATENTS

| 3,527,855 | 9/1970 | Parvin et al. | 264—92 |
| 3,126,582 | 3/1964 | Scott | 425—388 |
| 3,058,153 | 10/1962 | Busch | 264—92 UX |

ROBERT F. WHITE, Primary Examiner

J. H. SILBAUGH, Assistant Examiner

U.S. Cl. X.R.

264—89, 318